(12) United States Patent
Wilianto et al.

(10) Patent No.: US 8,863,135 B2
(45) Date of Patent: Oct. 14, 2014

(54) PREEMPTIVE SMART CARD ACCESS AND DATA TRANSFER BASED ON APPLICATION PRIORITY

(75) Inventors: Wilianto Wilianto, Meudon (FR); Krishna Sjarif, Meudon (FR)

(73) Assignee: Gemalto SA, Meudon (FR)

( * ) Notice: Subject to any disclaimer, the term of this patent is extended or adjusted under 35 U.S.C. 154(b) by 1009 days.

(21) Appl. No.: 12/306,494

(22) PCT Filed: Jun. 26, 2007

(86) PCT No.: PCT/IB2007/001733
§ 371 (c)(1),
(2), (4) Date: Oct. 26, 2009

(87) PCT Pub. No.: WO2008/001189
PCT Pub. Date: Jan. 3, 2008

(65) Prior Publication Data
US 2010/0037228 A1 Feb. 11, 2010

(30) Foreign Application Priority Data

Jun. 27, 2006 (CN) .......................... 2006 1 0121393

(51) Int. Cl.
| | | |
|---|---|---|
| G06F 9/46 | (2006.01) | |
| G06F 9/48 | (2006.01) | |
| G06F 15/16 | (2006.01) | |
| G06F 15/17 | (2006.01) | |
| H04L 9/00 | (2006.01) | |

(52) U.S. Cl.
CPC .................................. *G06F 9/4881* (2013.01)
USPC ............ 718/103; 718/102; 455/73; 455/899; 370/230; 370/235

(58) Field of Classification Search
None
See application file for complete search history.

(56) References Cited

U.S. PATENT DOCUMENTS

| | | | | |
|---|---|---|---|---|
| 5,996,037 | A * | 11/1999 | Emnett ......................... | 710/117 |
| 6,798,776 | B1 * | 9/2004 | Cheriton et al. .............. | 370/392 |
| 6,824,064 | B2 * | 11/2004 | Guthery et al. ............... | 235/492 |
| 7,234,139 | B1 * | 6/2007 | Feinberg ........................... | 718/1 |
| 7,586,909 | B1 * | 9/2009 | Walrand et al. ............... | 370/388 |

(Continued)

FOREIGN PATENT DOCUMENTS

| | | |
|---|---|---|
| CN | 1 592 886 A | 3/2005 |
| EP | 1 610 218 A2 | 12/2005 |
| WO | 03007105 A2 | 1/2003 |

OTHER PUBLICATIONS

Chinese Office Action for Application No. 2006101213937, dated Feb. 24, 2011, (6 pages).

(Continued)

*Primary Examiner* — Emerson Puente
*Assistant Examiner* — Benjamin Wu
(74) *Attorney, Agent, or Firm* — Osha Liang LLP

(57) ABSTRACT

The invention relates to a personal token running a series of applications, wherein said personal token includes a thread controller which transmits data from the applications to an external device in a cyclic way, a cycle being constituted of a series of data transfers from the applications and to the external device, a cycle comprising a respective number of data transfers dedicated to each respective application which is different according to the respective application, the number of data transfers for a respective application in a cycle corresponding to a priority level of the application as taken into account by the thread controller.

8 Claims, 3 Drawing Sheets

(56) References Cited

U.S. PATENT DOCUMENTS

| | | | |
|---|---|---|---|
| 2002/0066792 | A1 | 6/2002 | Guthery et al. |
| 2003/0231645 | A1* | 12/2003 | Chandra et al. ............... 370/412 |
| 2004/0092278 | A1* | 5/2004 | Diepstraten et al. .......... 455/512 |
| 2004/0205266 | A1* | 10/2004 | Regal et al. ..................... 710/29 |
| 2006/0020706 | A1* | 1/2006 | Kamiya et al. ................ 709/229 |
| 2006/0027644 | A1* | 2/2006 | Takashi et al. ................ 235/380 |
| 2006/0123152 | A1* | 6/2006 | Koch et al. ....................... 710/22 |
| 2008/0297312 | A1* | 12/2008 | Moshfeghi ................... 340/10.1 |
| 2010/0037230 | A1* | 2/2010 | Potonniee et al. ............ 718/103 |
| 2010/0125706 | A1* | 5/2010 | Hoeksel et al. ............... 711/115 |

OTHER PUBLICATIONS

International Search Report from PCT/IB2007/001733 dated Jan. 21, 2008 (3 pages).

Written Opinion from PCT/IB2007/001733 datd Jan. 21, 2008 (8 pages).

Clark, Martin P.; "Multiple Access Schemes for Point-to-Multipoint Operation"; Wireless Access Networks: Fixed Wireless Access and WLL Networks—Design and Operation; John Wiley & Sons; Oct. 5, 2001; pp. 69-78 (10 pages).

Deville, Damien, et al.; "Trusted Collaborative Real Time Scheduling in a Smart Card Exokernel"; Rapports De Recherche—Inria, Inria, Le Chesnay, France, No. 5161; Apr. 2004; pp. 1-15 (17 pages).

ETSI TS 143 019 V5.6.0; "Digital cellular telecommunications system (Phase 2+); Subscriber Identity Module Application Programming Interface (SIM API) for Java Card; Stage 2"; ETSI Standards, European Telecommunications Standards Institute, Sophia-Antipo, France; vol. 3-T3, No. V560; Mar. 2003 (26 pages).

* cited by examiner

PREEMPTIVE SMART CARD ACCESS AND DATA TRANSFER BASED ON APPLICATION PRIORITY

BACKGROUND

1. Field of the Invention

The invention relates to personal tokens used for authenticating a user when such user accesses to a limited or a private resources equipment such as a mobile telecommunication network, a remote server storing secret data or even a protected area with limited physical access thereto.

2. Related Art

The mostly known device of this type is the IC card such as for example a SIM card (Subscriber Identification Module) or a credit card, but it can also be a USB key, a mass memory card, or any kind of token carrying some necessary credentials.

Such tokens are typically compliant with international standard ISO7816.

Because of the resource limitation in SIM card, previous generation of SIM card usually can only work in single thread model, where only one SIM application can run at one time.

Later generation of SIM cards can work with multi-thread model by using a "Logical Channel" concept (using a different APDU parameter so as to indicate to use different threads). But this method has little acceptance because it raises compatibility issues between terminals and SIM cards.

Multi-thread model of SIM applications is more and more required. Particularly in recent transition of SIM application role from STK (SIM application toolkit) only, which requires only single thread model, to SCWS (Smart Card Web Server), which requires to handle several requests from web clients in parallel.

SUMMARY

In such respect one purpose of the invention to provide an enhanced method to control several simultaneous processes (threads) of data transfer sessions between a terminal and a personal token in general, e.g. SIM card in particular.

BRIEF DESCRIPTION OF DRAWINGS

Other purposes, benefits and aspects of the invention will appear through the following description, which is made in reference to the appended figures, among which.

DETAILED DESCRIPTION

An embodiment will now be described in the context of a SIM (Subscriber Identification Module) and in relation to a mobile phone terminal as depicted schematically on FIG. 1.

Figure 1:
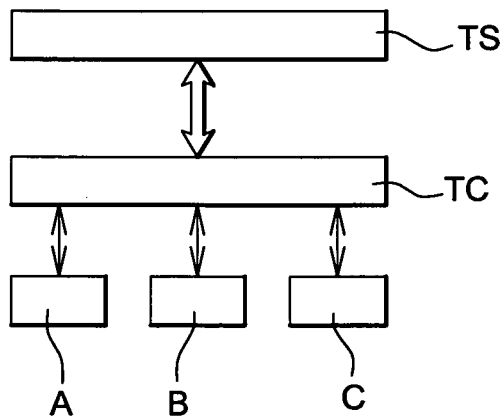
FIG. 1 depicts a general architecture of a thread controller according to an embodiment of the invention.

Such SIM stores and runs a set of applications, for example Java applications, referenced A, B, C on FIG. 1. In addition to applications A, B and C, the exemplified SIM includes a logic entity, typically a software program, which is a thread controller TC, as described hereafter. Thread Controller TC is here a program which controls several threads that share one APDU (Application Protocol Data Unit) exchange channel between the SIM card and the terminal. Thread controller TC will perform a time-sharing of the channel based on an APDU switching between several threads so they can run in parallel.

The terminal as for itself includes a software equipment, for example a set of terminal applications, which is represented under general reference TS on FIG. 1.

In the present embodiment, the SIM applications have to run in compliance with a multi thread model, i.e. they have to exchange APDU commands with the terminal in a seemingly simultaneous manner, i.e. more precisely some of the applications of the SIM may send and receive APDUs in an alternate manner. For example, a first application may send and receive a first set of APDUs, and then another application may send and receive its own set of APDUs before the first application then goes on with a following set of further APDUs.

The present embodiment is easily implemented although the limited resource in the SIM.

A data transfer is considered here as an APDU transfer between terminal and SIM card. Here, the SIM card can act as both server and client. In this embodiment, one session of data transfer is considered as one thread.

Simultaneous process of data transfer sessions here is management of several data transfer sessions which are running in parallel.

There will now be described how the thread controller TC interfaces with the SIM applications A, B and C.

All SIM applications A, B, and C have registered by the thread controller. This preliminary step occurs preferably at power on of the mobile phone. During such registration, every SIM application shall provide its priority parameter to the thread controller, which priority parameter may range from 0 (lowest priority) to N (highest priority). However, each application may change its priority in the middle by registering again to the thread controller. Such priority changing may be triggered for example by a particular routine of the application being reached which requires a higher amount of exchanges with the terminal.

All incoming and outgoing APDU to/from SIM applications should go through the thread controller.

One channel APDU which is available will be shared between several SIM applications. The mechanism to share this channel is using of a time-sharing approach (instead of logical channel approach). Before any APDU exchange, thread controller will decide which application needs to be invoked, and send its APDU to the terminal.

The thread controller TC manages a queue buffer to manage all the application which register to it. Queue buffer stores the reference of all SIM applications which have been registered. For the purpose of managing the applications, a higher priority application has more entries in the buffer. For example, an application with priority=2 will have 2 entries in the queue, and an application with priority=5 will have 5 entries in the queue.

To manage the "time-sharing" mechanism, and select the application to use the APDU channel, the thread controller TC scans the queue buffer in a cyclic way. In this way, the application which has higher priority will automatically has more chance to use APDU channel.

Priority=1 means, for every cycle, Thread Controller will activate the particular SIM application one time. Priority=5 (still <N) means, for every cycle, thread controller TC will activate the particular SIM application five times (higher priority). Priority=0 means it always runs in background mode. This thread will only be executed after all other threads are finished. Priority-N means that the considered thread will interrupt the other threads, and the considered thread will be executed until finished before the thread controller TC continues to execute the other threads. If a thread has finished its execution, the thread controller TC will delete all entries related with it from the queue buffer together with its context, as explained hereafter.

A data transfer session is a session of data transfers between client and server. One session can consist of several APDU exchanges. During a data transfer session, both server and client must maintain several session variables, i.e. the above mentioned context, which is specific to the current session, and can only be cleared after the session is finished. The thread controller TC will also manage buffers which store each active thread's context. This context to be buffered can be 2 kinds: The first kind is the APDU which is about to be sent by the SIM application. The second kind is the APDU which is a response from the terminal and which is supposed to be sent to the application.

Figure 2:
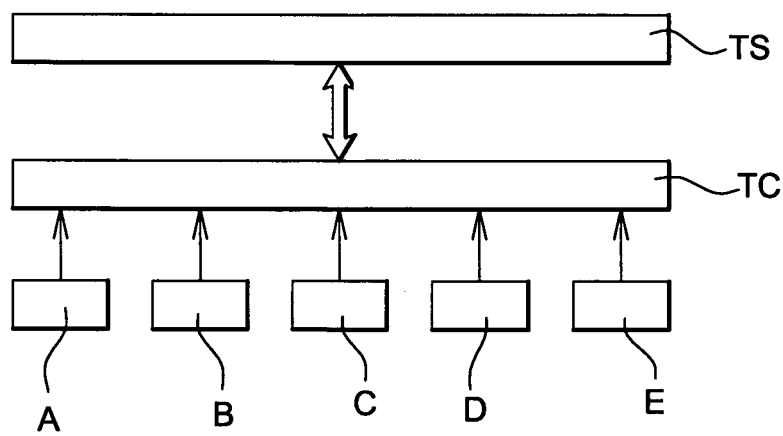
FIG. 2 illustrates a control of threads by a thread controller according to a more precise embodiment of the invention.

A more precise example will now be given in reference to FIG. 2, in which five SIM applications A, B, C, D, E are implied.

Those five SIM applications have been registered to the thread controller TC. Application A is registered with priority A=1, application B is registered with priority=3, application C is registered with priority=5, application D is registered with priority=0, and application E is registered with priority=6, where 6 is the highest-priority, i.e. the above mentioned "N" priority.

Suppose that these five applications are running in parallel, content of queue buffer in thread controller will be like: A, B, B, B, C, C, C, C, C, . . . .

The respective threads D and E of applications D and E will not be stored in the queue buffer. Thread E will be executed first until it is finished. Then threads A, B, C will be executed in parallel with APDU switch mechanism.

The cycle of execution will be: A, B, B, C, C, C, C, C, A, B, B . . . until finish. After A, B, C are finished, thread D will be executed.

Figure 3:
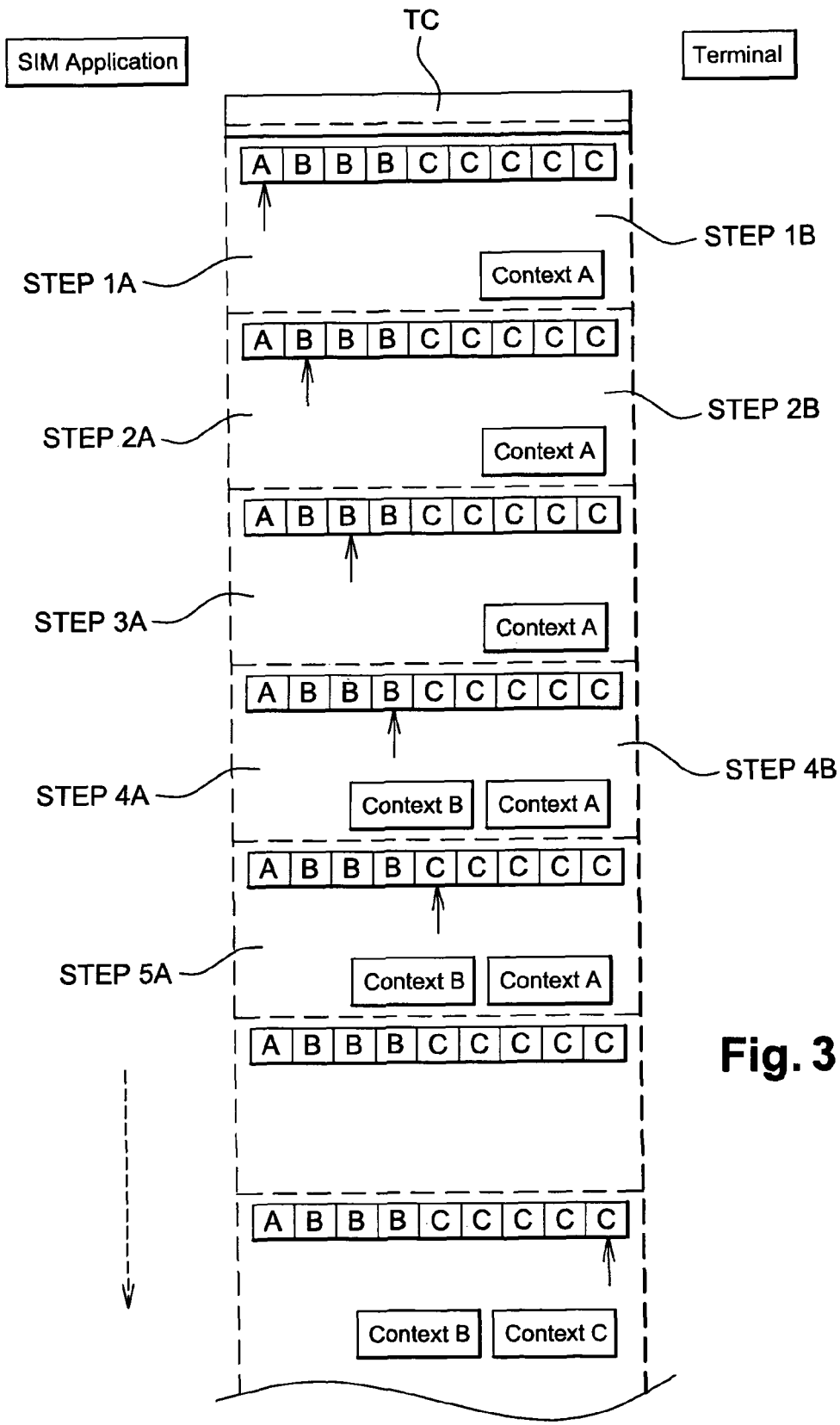
FIG. 3 is a timeline which illustrates a time-sharing for a single APDU channel according to the same embodiment of the invention.

Referring now to FIG. 3, in Step 1a application A sends a first APDU to the terminal software TS.

In step 1b, the terminal software TS receives the APDU from application A. Because the next step is the turn of application B, thread controller TC creates the context buffer for application A which has just received the response APDU from terminal software TS so that the stored context includes the returned APDU.

In step 2a, application B is enabled to send an APDU to terminal software TS because now it is the turn of application B.

In step 2b, terminal software TS receives an APDU command from application B, and terminal software TS returns an APDU command for application B. The context buffer which relates to application A is still preserved.

In step 3a, application B is still enabled to send an APDU command to terminal software TS.

In step 4a, application B can still send an APDU command to terminal software TS. In step 4b, terminal software TS receives such APDU command from application B.

Because the next step is the turn of application C, thread controller TC creates the context buffer which relates to application B. In step 5a, application C is enabled to send an APDU command to terminal software TS because now it is the turn of application C.

The next step, i.e. the step at the end of the illustrated doted arrow, is a step where the turn of application A comes back. Thread controller TC switches from context buffer of application C to context buffer of application A. Context buffer of application A contains the return APDU from terminal software TS to application A as occurred in Step 1b.

Figure 4:
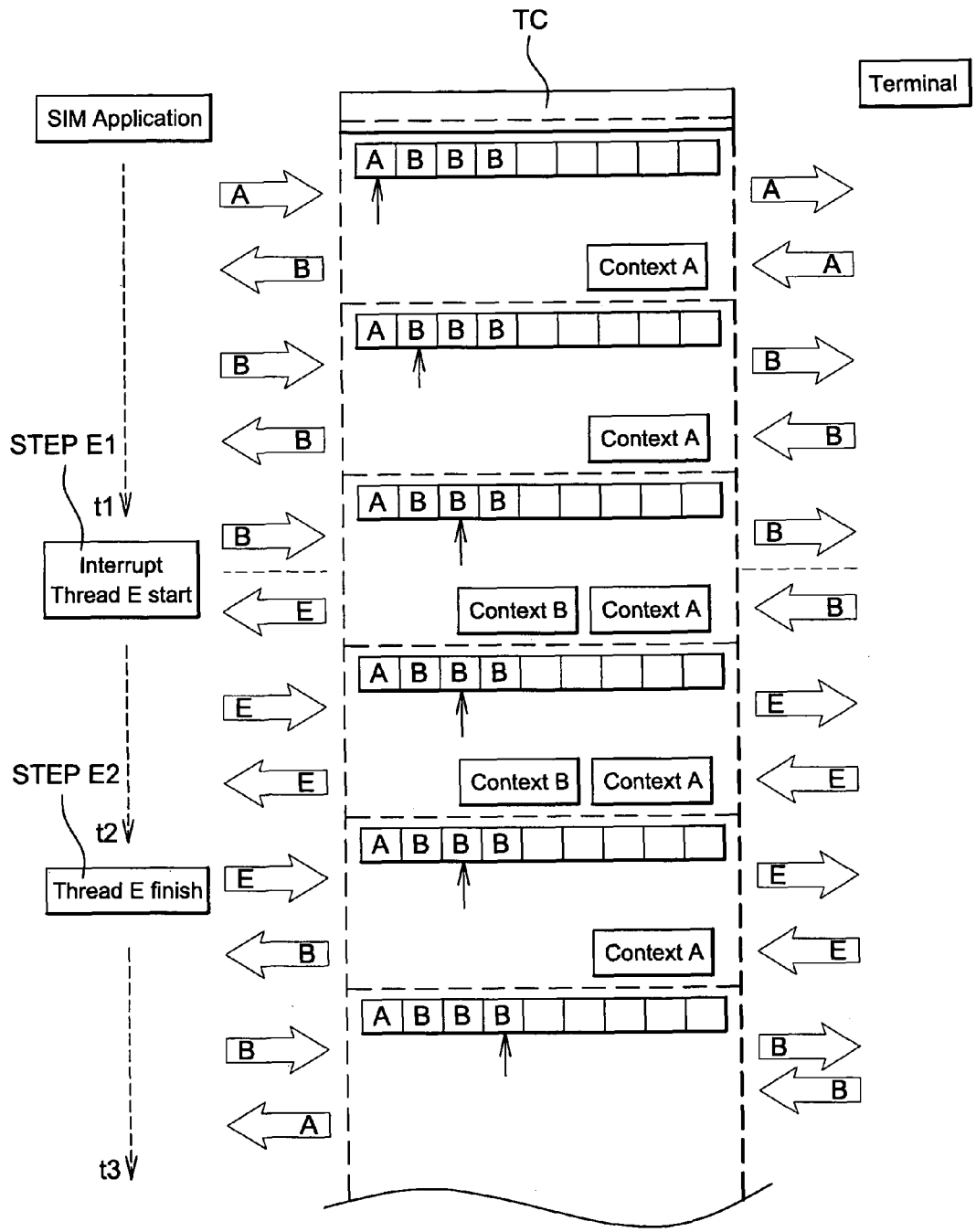
FIG. 4 is a timeline which illustrates how a particular application may benefit from a specific priority over other applications in an embodiment of the invention.

On FIG. 4, similar basic steps are illustrated. FIG. 4 represents a situation where threads A and B are running. In addition to the example explained above, after some time application E starts running, triggered by a specific event. At step E1, thread E interrupts threads A and B because it has priority=6, i.e. above explained priority "N". Thread controller TC will allocate all of time for thread E until it is finished before resuming at step E2 to execute threads A and B.

The present embodiment of the invention has been described wherein the thread controller is implemented in the SIM. In an alternate embodiment of the invention, the thread controller may be implemented in the mobile terminal, and may control the priorities of applications which may reside in the associated SIM.

The invention claimed is:

1. A personal token running comprising:
a processor;
a queue buffer comprising a cycle which constitutes a series of pending data transfer requests from a plurality of applications executing on the personal token to an external device, wherein each of the plurality of applications is assigned a respective number of the pending data transfer requests in the cycle corresponding to its priority level; and
a thread controller, running on the processor, that traverses the queue buffer to service the series of pending data transfer requests in the cycle to allow each of the plurality of applications to perform its respective number of data transfers,
wherein the thread controller interprets a first application executing on the personal token and having a predefined highest priority level as entitled to interrupt data transfers from the plurality of applications and allows the first application to perform all its data transfers to the external device, before resuming the data transfers from the plurality of applications, and
wherein the thread controller interprets a second application executing on the personal token and having a predefined lowest priority level as entitled to perform all its data transfers to the external device only after completing the series of pending data transfer requests in the cycle with each of the plurality of applications having performed all of its respective number of data transfers.

2. The personal token of claim 1, wherein, with the exception of the predefined highest priority level and the predefined lowest priority level, the respective number of the pending data transfer requests in the cycle is equal to the priority level of each application.

3. The personal token of claim 1, further including a memory area for storing data of at least one of the applications waiting to transfer the data.

4. The personal token of claim 3, wherein the thread controller updates the data in the memory area of each respective application at every cycle.

5. The personal token of claim 1, wherein the thread controller updates a context of the application currently performing its data transfers when the application has completed all of its respective number of data transfers in the cycle.

6. The personal token of claim 1, wherein the application currently performing the data transfer proceeds the data transfer by sending or receiving an APDU command.

7. A physical module comprising a logic entity for controlling data transfers to and/or from a personal token which comprises:

a queue buffer comprising a cycle which constitutes a series of pending data transfer requests from a plurality of applications executing on the personal token to an external device, wherein each of the plurality of applications is assigned a respective number of the pending data transfer requests in the cycle corresponding to its priority level; and a thread controller that traverses the queue buffer to service the series of pending data transfer requests in the cycle to allow each of the plurality of applications to perform its respective number of data transfers, wherein the thread controller interprets a first application executing on the personal token and having a predefined highest priority level as entitled to interrupt data transfers from the plurality of applications and allows the first application to perform all its data transfers to the external device, before resuming the data transfers from the plurality of applications, and wherein the thread controller interprets a second application executing on the personal token and having a predefined lowest priority level as entitled to perform all its data transfers to the external device only after completing the series of pending data transfer requests in the cycle with each of the plurality of applications having performed all of its respective number of data transfers.

8. A method for managing data transfers between a plurality of applications executing on a personal token and an external device, the method comprising:

maintaining, on the personal token, a queue buffer comprising a cycle which constitutes a series of pending data transfer requests from the plurality of applications to the external device, wherein each of the plurality of applications is assigned a respective number of the pending data transfer requests in the cycle corresponding to its priority level; and executing, on the personal token, a thread controller that traverses the queue buffer to service the series of pending data transfer requests in the cycle to allow each of the plurality of applications to perform its respective number of data transfers, wherein the thread controller interprets a first application executing on the personal token and having a predefined highest priority level as entitled to interrupt data transfers from the plurality of applications and allows the first application to perform all its data transfers to the external device, before resuming the data transfers from the plurality of applications, and wherein the thread controller interprets a second application executing on the personal token and having a predefined lowest priority level as entitled to perform all its data transfers to the external device only after completing the series of pending data transfer requests in the cycle with each of the plurality of applications having performed all of its respective number of data transfers.

* * * * *